(12) United States Patent
DeLong et al.

(10) Patent No.: US 10,919,497 B1
(45) Date of Patent: Feb. 16, 2021

(54) SYSTEMS AND METHODS FOR STARTING A VEHICLE USING A SECURE PASSWORD ENTRY SYSTEM

(71) Applicant: Ford Global Technologies, LLC, Dearborn, MI (US)

(72) Inventors: Aaron Matthew DeLong, Toledo, OH (US); Eugene Karpinsky, Farmington Hills, MI (US); Cameron Smyth, Wyandotte, MI (US); Timothy Thivierge, Jr., Carleton, MI (US); Daniel King, Northville, MI (US); Kevin Thomas Hille, Plymouth, MI (US); Farhan Ehsan, Lasalle (CA); John Robert Van Wiemeersch, Novi, MI (US); Santosh Kumar Lalwani, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/597,571

(22) Filed: Oct. 9, 2019

(51) Int. Cl.
*F02N 11/12* (2006.01)
*B60R 25/24* (2013.01)
*H04L 9/32* (2006.01)

(52) U.S. Cl.
CPC .......... *B60R 25/246* (2013.01); *H04L 9/3226* (2013.01); *H04L 9/3242* (2013.01); *H04L 9/3271* (2013.01)

(58) Field of Classification Search
CPC ... B60R 25/246; B60R 25/209; H04L 9/3242; H04L 9/3271; H04L 9/3226; F02N 11/0807; F02N 11/12
USPC ........................................ 123/179.2; 701/113
See application file for complete search history.

(56) References Cited

U.S. PATENT DOCUMENTS

| | | | |
|---|---|---|---|
| 9,120,452 B2 * | 9/2015 | Nishimoto | .......... B60R 25/1001 |
| 2015/0025746 A1 * | 1/2015 | Yoshizawa | .......... F02N 11/0822 |
| | | | 701/41 |

* cited by examiner

*Primary Examiner* — Hai H Huynh
(74) *Attorney, Agent, or Firm* — Frank Lollo; Eversheds Sutherland (US) LLP

(57) ABSTRACT

Exemplary embodiments described in this disclosure are generally directed to systems and methods for ensuring password security when starting a vehicle having a keyless engine starting system. In an exemplary method, a computer detects a depression of an engine start push button when no phone-as-a-key (PaaK) device or passive-entry-passive-start (PEPS) key fob is present in the vehicle. The computer responds by executing a verification procedure prior to password validation. The verification procedure can include operations such as determining that no PaaK device or PEPS key fob is present either inside the vehicle or within a defined geofence outside the vehicle. If the verification procedure is successful, the computer displays a prompt upon a display screen for entering of a password. The computer then uses various security measures when verifying the validity of an entered password, followed by displaying of a message indicating acceptance or rejection of the password.

20 Claims, 6 Drawing Sheets

SYSTEMS AND METHODS FOR STARTING A VEHICLE USING A SECURE PASSWORD ENTRY SYSTEM

FIELD OF THE DISCLOSURE

This disclosure generally relates to operations associated with a vehicle, and more particularly relates to using a password to start a vehicle.

BACKGROUND

Car manufacturers constantly strive to provide various features and devices that make it more convenient or pleasurable for a consumer to drive a vehicle. For example, many car manufacturers now provide an infotainment system that combines various entertainment devices (such as a radio, streaming audio solutions, and USB access ports for digital audio devices) with elements such as a navigation system that provides navigation instructions to a driver of the car. As another example, many car manufacturers now offer a passive entry (cabin unlock) and passive start (engine starting) system that eliminates the need for a driver to insert a key into a door lock cylinder or ignition lock. One passive engine starting system incorporates the presence of a key fob for starting an engine without the need to insert a mechanical key into an ignition lock cylinder. Another passive entry and start system, which is generally referred to as a phone-as-a-key (PaaK) system, involves the use of a smartphone in place of the passive key. The driver may enter a unique password into the smartphone that enables the operation of the engine via the engine-start push-button in the vehicle. In a variation of this system, the driver may enter the password into an infotainment system in the vehicle that then enables the operation of the engine-start push-button. However, password entry systems can be vulnerable to hacking and malicious misuse. Consequently, it is desirable to provide systems and methods that allow secure creation and use of passwords and/or keypad codes for use on vehicles.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
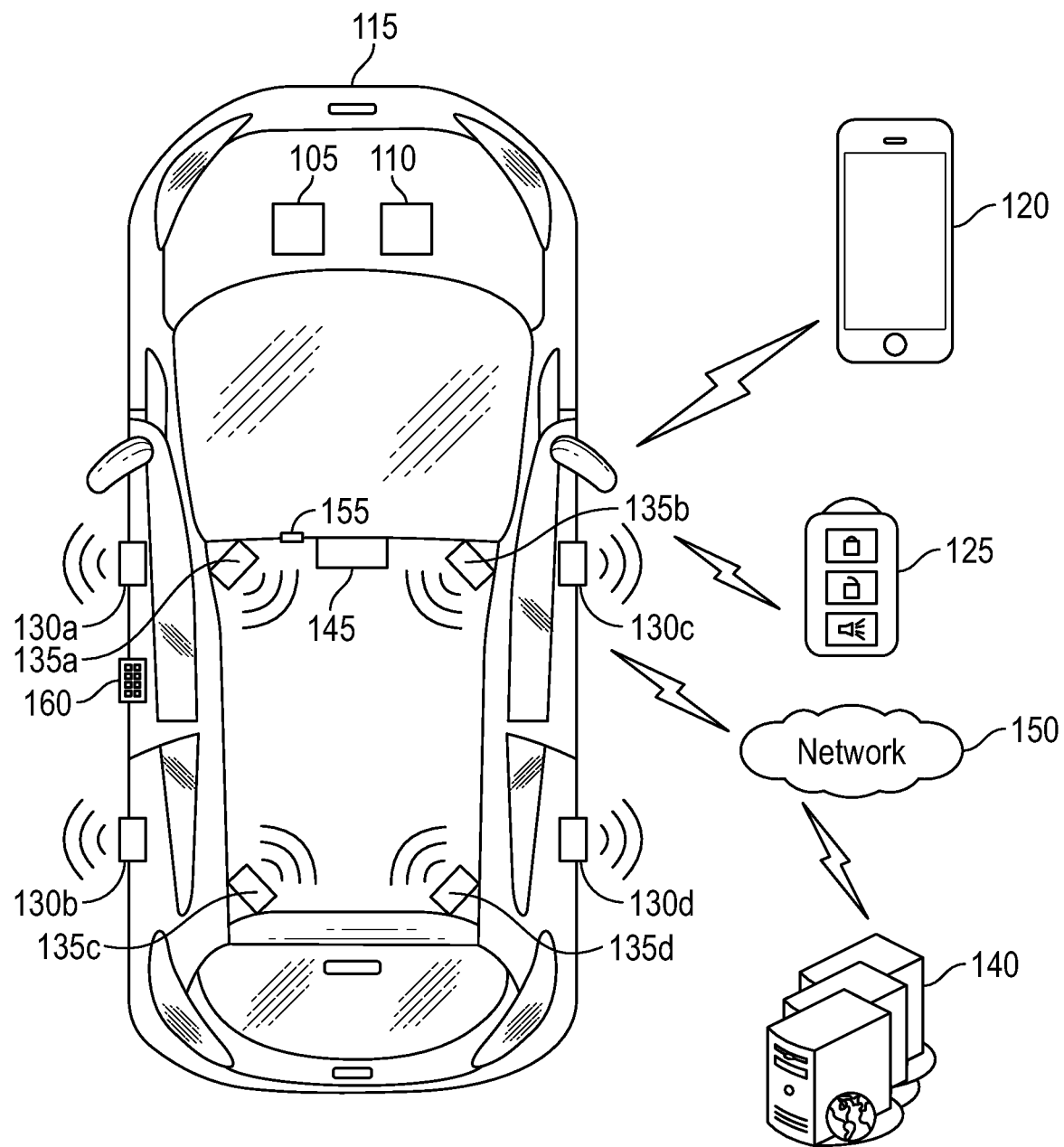
FIG. 1 shows an exemplary vehicle that supports various remote entry and passive operations in accordance with the disclosure.

In terms of a general overview, certain embodiments described in this disclosure are directed to systems and methods for ensuring password security when starting a vehicle having a keyless engine starting system. In an exemplary method, a computer detects a depression of an engine-start push button when no phone-as-a-key (PaaK) device or passive-entry-passive-start (PEPS) key fob is present in the vehicle. The computer responds by executing a verification procedure prior to password validation. The verification procedure can include operations such as determining that no PaaK device or PEPS key fob is present either inside the vehicle or within a defined geofence outside the vehicle. If the verification procedure is successful, the computer displays a prompt upon a display screen for entering of a password. The computer then uses various security measures when verifying the validity of an entered password, followed by displaying of a message indicating acceptance or rejection of the password.

Illustrative Embodiments

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, words such as "wireless" or "wirelessly" as used herein in the context of communication links are not intended to preclude other forms of communication links such as optical communication links and wired communication links that may be used alternatively. It should be understood that some or all of the description provided herein with respect to a "password" may be equally applicable to a keypad code that is used to open/close a door of a vehicle, or a passcode (a number, a word, an alphanumeric entry, etc.) that is entered into a graphical user interface (GUI) in the vehicle for starting the vehicle. Thus, for example, various steps of a procedure for generating a password should be understood to encompass equivalent steps for generating a keypad code. Furthermore, it should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

FIG. 1 shows an exemplary vehicle 115 that supports various remote, passive, and keyless operations in accordance with the disclosure. The vehicle 115 may be any of various types of vehicles such as a gasoline powered vehicle, an electric vehicle, a hybrid electric vehicle, or an autonomous vehicle, and may include components such as a vehicle computer 110, an infotainment system 145, a remote, passive, and keyless entry management system 105, and a wireless communication system. The vehicle computer 110 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). In some cases, the vehicle computer 110 may include more than one computer such as, for example, a first computer that controls engine operations and a second computer that operates the infotainment system 145.

The infotainment system 145 can be an integrated unit that includes various components (such as a radio), streaming audio solutions, and USB access ports for digital audio devices), and a navigation system. In an exemplary implementation, the infotainment system 145 has a display system that includes a graphical user interface (GUI) for use by an occupant of the vehicle 115. The GUI may be used for various purposes such as to make a request for a back-up password to be associated with a phone-as-a-key (PaaK) device account and/or to input destination information for obtaining travel guidance from the navigation system.

The keyless entry management system 105 may be configured to interact with various types of components in the vehicle 115. For example, the keyless entry management system 105 may be configured to control various operations such as locking and unlocking of the doors of the vehicle 115, receiving and verifying a password, and enabling an engine-start push-button 155 in the vehicle 115 upon verification of a password.

In an exemplary implementation in accordance with the disclosure, the keyless entry management system 105 may be configured to support wireless communications with one or more PaaK devices and one or more PEPS key fobs. In this exemplary implementation, a PaaK device 120 is a smartphone configured to run a PaaK software application. The PaaK software application allows the PaaK device 120 to be used for performing various operations such as locking or unlocking a door of the vehicle 115 and/or for starting the engine of the vehicle 115. In at least some cases, the PaaK device 120 may eliminate the need to use a factory key fob, which can prove particularly useful in certain situations such as when the factory key fob is lost or has been accidentally misplaced.

The PaaK device 120 may use one or more of various wireless technologies such as Bluetooth®, Ultra-Wideband, Wi-Fi, Zigbee®, or near-field-communications (NFC), for carrying out wireless communications. In one exemplary implementation, a first set of wireless communication nodes 130a, 130b, 130c, and 130d may be provided on the body of the vehicle 115. In an alternative implementation, a single wireless communication node may be mounted upon the roof of the vehicle 115. The PaaK device 120 may communicate with the vehicle computer 110 via one or more of the first set of wireless communication nodes 130a, 130b, 130c, and 130d so as to allow, for example, an occupant of the vehicle 115 to start the engine before entering the vehicle 115. A radiation pattern of each of the antennas in the wireless communication nodes 130a, 130b, 130c, and 130d may be oriented outwards so as to provide the greatest wireless coverage outside the vehicle 115.

A second set of wireless communication nodes 135a, 135b, 135c, and 135d may be used to provide wireless coverage in the cabin area of the vehicle 115. A radiation pattern of each of the antennas in the wireless communication nodes 135a, 135b, 135c, and 135d may be oriented in a manner that provides optimized wireless coverage inside the vehicle 115. The keyless entry management system 105 may use some or all of the wireless communication nodes 135a, 135b, 135c, and 135d to communicate with one or more PaaK devices located inside the vehicle 115. In one exemplary operation, the keyless entry management system 105 may use three or more of the wireless communication nodes 135a, 135b, 135c, and 135d to carry out a received signal strength indication (RSSI) and/or a time-of-flight (ToF) trilateration procedure to locate one or more PaaK devices inside the vehicle 115. For example, the RSSI and/or ToF trilateration procedure may allow the keyless entry management system 105 to locate and identify a first PaaK device carried by a driver in the vehicle 115 and a second PaaK device carried by a passenger in the vehicle 115.

The PEPS key fob 125 may use one or more of various wireless technologies such as Bluetooth®, Ultra-Wideband, Wi-Fi, Zigbee®, or near-field-communications (NFC), for carrying out wireless communications. In one exemplary implementation, the PEPS key fob 125 communicates with one of the wireless communication nodes 130a, 130b, 130c, and 130d to allow a holder of the PEPS key fob 125 to open a door of the vehicle 115 passively or by depressing a first button on the PEPS key fob 125. The PEPS key fob 125 may include various other buttons such as a door lock button and a panic button. The PEPS key fob 125 may also be used to start the vehicle 115. This action may be carried out by the keyless entry management system 105 sensing the presence of the PEPS key fob 125 inside the vehicle 115 and enabling the engine-start push-button 155 to allow the driver to start the vehicle 115.

In an exemplary embodiment in accordance with the disclosure, the PEPS key fob 125 is linked to the PaaK device 120. For example, the keyless entry management system 105 may use a key index to recognize that the PEPS key fob 125 and the PaaK device 120 are possessed (and operated) by an individual such as the driver of the vehicle 115. In another exemplary embodiment in accordance with the disclosure, the functionality provided by the PEPS key fob 125 may be provided in a different form such as in the form of an NFC card, an identification card, or a biometric device (eye scanner, facial scanner, etc.).

The exemplary vehicle 115 may include a keypad 160 that is located on a driver side door of the vehicle. Similar keypads may be located on other doors of the vehicle 115. A keypad code that is selected by the driver of the vehicle 115 can be used to operate the keypad 160 for opening the driver side door of the vehicle 115. The keyless entry management system 105 may manage various operations associated with the keypad 160 such as verifying a keypad code entered into the keypad 160 and/or processing a request for a new keypad code.

In the exemplary embodiment shown in FIG. 1, the keyless entry management system 105 is communicatively coupled to a server computer 140 via a network 150. The network 150 may include any one, or a combination of networks, such as a local area network (LAN), a wide area network (WAN), a telephone network, a cellular network, a cable network, a wireless network, and/or private/public networks such as the Internet. For example, the network 150 may support communication technologies such as Bluetooth®, cellular, near-field communication (NFC), Wi-Fi, Wi-Fi direct, machine-to-machine communication, and/or man-to-machine communication. At least one portion of the network 150 includes a wireless communication link that allows the server computer 140 to communicate with one or more of the wireless communication nodes 130a, 130b, 130c, and 130d on the vehicle 115. The server computer 140 may communicate with the keyless entry management system 105 for various purposes such as for password registration and/or password verification.

Figure 2:
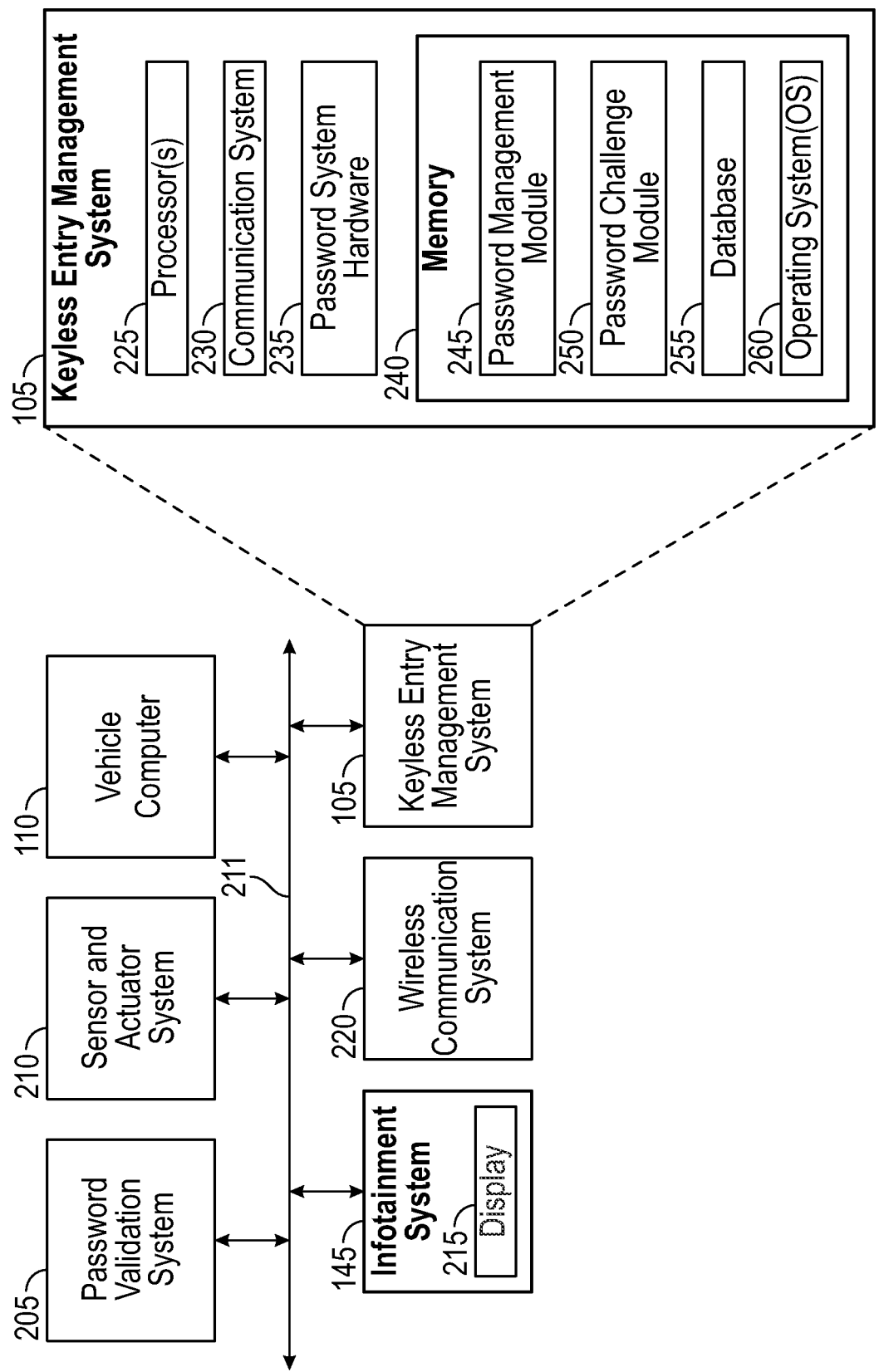
FIG. 2 shows some exemplary components that may be included in the vehicle shown in FIG. 1.

FIG. 2 shows some exemplary components that may be included in the vehicle 115. The exemplary components may include the vehicle computer 110, the infotainment system 145, a password validation system 205, a wireless communication system 220, a sensor and actuator system 210, and the keyless entry management system 105. The various components are communicatively coupled to each other via one or more buses such as an exemplary bus 211. The bus 211 may be implemented using various wired and/or wireless technologies. For example, the bus 211 can be a vehicle bus that uses a controller area network (CAN) bus protocol, a Media Oriented Systems Transport (MOST) bus protocol, and/or a CAN flexible data (CAN-FD) bus protocol. Some or all portions of the bus 211 may also be implemented using wireless technologies such as Bluetooth®, Ultra-Wideband, Wi-Fi, Zigbee®, or near-field-communications (NFC). For example, the bus 211 may include a Bluetooth® communication link that allows the password validation system 205 and/or the keyless entry management system 105 to wirelessly communicate with each other and/or with the vehicle computer 110.

The infotainment system 145 can include a display system 215 having a GUI for carrying out various operations. The GUI may be used, for example, to enter a password during a password registration procedure. The entered password may be communicated to the password validation system 205 which communicates with the keyless entry management system 105 to execute a password registration procedure. As described below in more detail, the password registration procedure may include a handshake sequence between the password validation system 205 and the keyless entry management system 105 and other security measures so as to ensure security and maintain an integrity of the password.

The sensor and actuator system 210 can include various types of sensors such as, for example, a seat pressure sensor for detecting the presence of one or more occupants in the vehicle 115 and an object sensor for detecting various objects such as the PEPS key fob 125 when the PEPS key fob 125 is present in the vehicle 115, or an NFC card placed in or on a cabin sensor of the vehicle 115. The sensor and actuator system 210 can also include various types of actuators such as, for example, an actuator to enable operation of the engine-start push-button 155 in the vehicle 115 after the keyless entry management system 105 has verified and validated an entered password.

The wireless communication system 220 can include various wireless communication nodes such as the wireless communication nodes 130a, 130b, 130c, and 130d and wireless communication nodes 135a, 135b, 135c, and 135d. In one exemplary implementation, some or all of the wireless communication nodes can include a Bluetooth® low energy module (BLEM) and/or a Bluetooth® low energy antenna module (BLEAM).

The keyless entry management system 105 may include a processor 225, a communication system 230, password system hardware 235, and a memory 240. The communication system 230 can include one or more wireless transceivers (BLEAMs, for example) that allow the keyless entry management system 105 to transmit and/or receive various types of data from the password validation system 205 via the wireless communication system 220. The communication system 230 can also include hardware for communicatively coupling the keyless entry management system 105 to the network 150 for carrying out communications and data transfers with the server computer 140. In an exemplary embodiment in accordance with the disclosure, the communication system 230 includes various security measures to ensure that messages transmitted between the keyless entry management system 105 and other elements such as the password validation system 205 are not intercepted for malicious purposes. For example, the communication system 230 may be configured to provide features such as encryption and decryption of messages, time windows for transmitting and/or receiving of messages, and radio-frequency (RF) safeguards for RF signal transmissions.

The password system hardware 235 may include hardware such as one or more application specific integrated circuits (ASICs) containing circuitry that allows the keyless entry management system 105 to interface with components such as the password validation system 205 and/or the infotainment system 145 for carrying out various actions in accordance with the disclosure.

The memory 240, which is one example of a non-transitory computer-readable medium, may be used to store an operating system (OS) 260, a database 255, and various code modules such as a password management module 245 and a password challenge module 250. The code modules are provided in the form of computer-executable instructions that can be executed by the processor 225 for performing various operations in accordance with the disclosure.

The password management module 245 may be executed by the processor 225 for performing various operations related to passwords. For example, the password management module 245 may cooperate with the password validation system 205 for registering new passwords or keypad codes and/or for validating a password that is entered into the password validation system 205 via the infotainment system 145 or associated with the PaaK device 120. Validating a password may include the password challenge module 250 issuing a challenge to the password validation system 205 for purposes of ensuring that a valid password request has been originated via the password validation system 205.

In one exemplary implementation, the database 255 may be used to store passwords related to one or more drivers of the vehicle 115. In another exemplary implementation, passwords related to one or more drivers of the vehicle 115 may be stored on the server computer 140 and fetched by the keyless entry management system 105 on an as-needed basis. In yet another exemplary implementation, passwords related to one or more drivers of the vehicle 115 may be stored in a cloud storage system and fetched by the keyless entry management system 105 on an as-needed basis. In some or all such implementations, the passwords may be stored in hashed form for security purposes.

It must be understood that even though the various components in FIG. 2 are shown as discrete functional blocks, some of these components, or some parts of these components, may be combined together in some implementations in accordance with the disclosure. For example, in one exemplary implementation, the password validation system 205 may be integrated with the keyless entry management system 105 and the processor 225 configured to execute operations of the password validation system 205 as well as the keyless entry management system 105. In another implementation, the password validation system 205 and/or the keyless entry management system 105 may be integrated with the vehicle computer 110.

Figure 3:
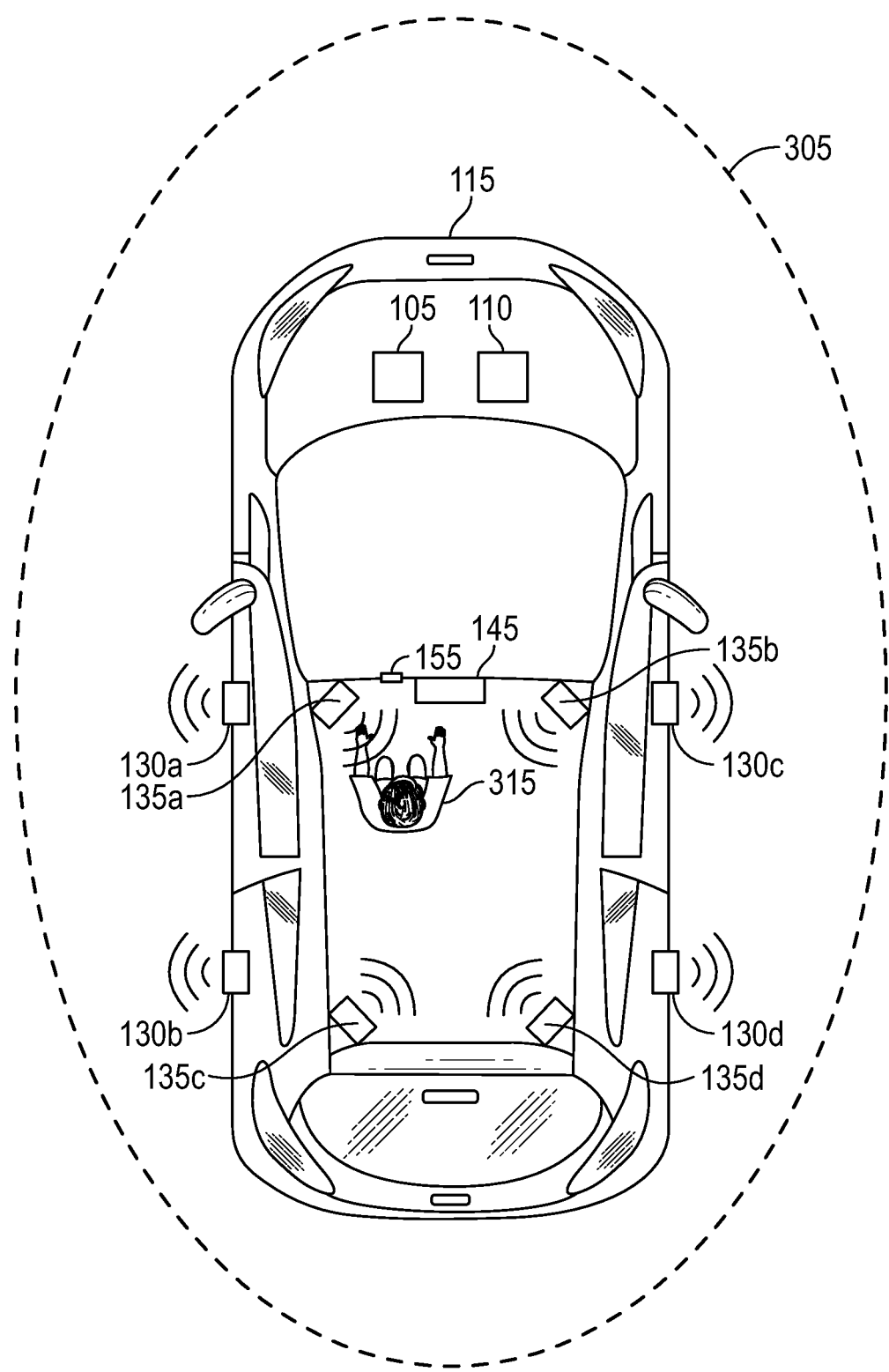
FIG. 3 shows an exemplary configuration in accordance with the disclosure that may be used for ensuring password security when using a password to start a vehicle.

FIG. 3 shows an exemplary configuration in accordance with the disclosure that may be used for ensuring password security when using a password to start the vehicle 115. In this exemplary configuration, the keyless entry management system 105 may cooperate with the first set of wireless communication nodes 130a, 130b, 130c, and 130d to determine if any PaaK device or any PEPS key fob is present inside the vehicle 115 and/or if any other personal identification element such as an NFC card or a biometric device (eye scanner, facial scanner, etc.) has been used for identifying a biometric trait of an occupant of the vehicle 115. If no PaaK device or PEPS key fob is present inside the vehicle 115 and/or no personal identification element has been used, the keyless entry management system 105 may cooperate with the second set of wireless communication nodes 135a, 135b, 135c, and 135d to determine if any PaaK device or any PEPS key fob is present outside the vehicle 115.

In one exemplary implementation, the second set of wireless communication nodes 135a, 135b, 135c, and 135d may search for any PaaK device or any PEPS device that may be present within a defined geofence 305 outside the vehicle 115. The defined geofence 305 may be predefined in various ways such as based on the dimensions of the vehicle 115, a shape of the vehicle 115, minimizing false detects, and/or a wireless signal strength of one or more of the second set of wireless communication nodes 135a, 135b, 135c, and 135d. The use of the defined geofence 305 minimizes or eliminates an undesirable number of false detects that may occur if the second set of wireless communication nodes 135a, 135b, 135c, and 135d detected PaaK device and/or PEPS key fobs carried by people passing by the vehicle 115 or entering into another vehicle that is parked beside the vehicle 115.

False detects may be further minimized by using the first set of wireless communication nodes 130a, 130b, 130c, and 130d to corroborate detection of a PaaK device and/or a PEPS key fob by the second set of wireless communication nodes 135a, 135b, 135c, and 135d. The corroborative action may be used to confirm that the PaaK device or PEPS key fob detected by the second set of wireless communication nodes 135a, 135b, 135c, and 135d was carried by a person who has entered the vehicle 115, such as a driver 315, for example.

Figure 4:
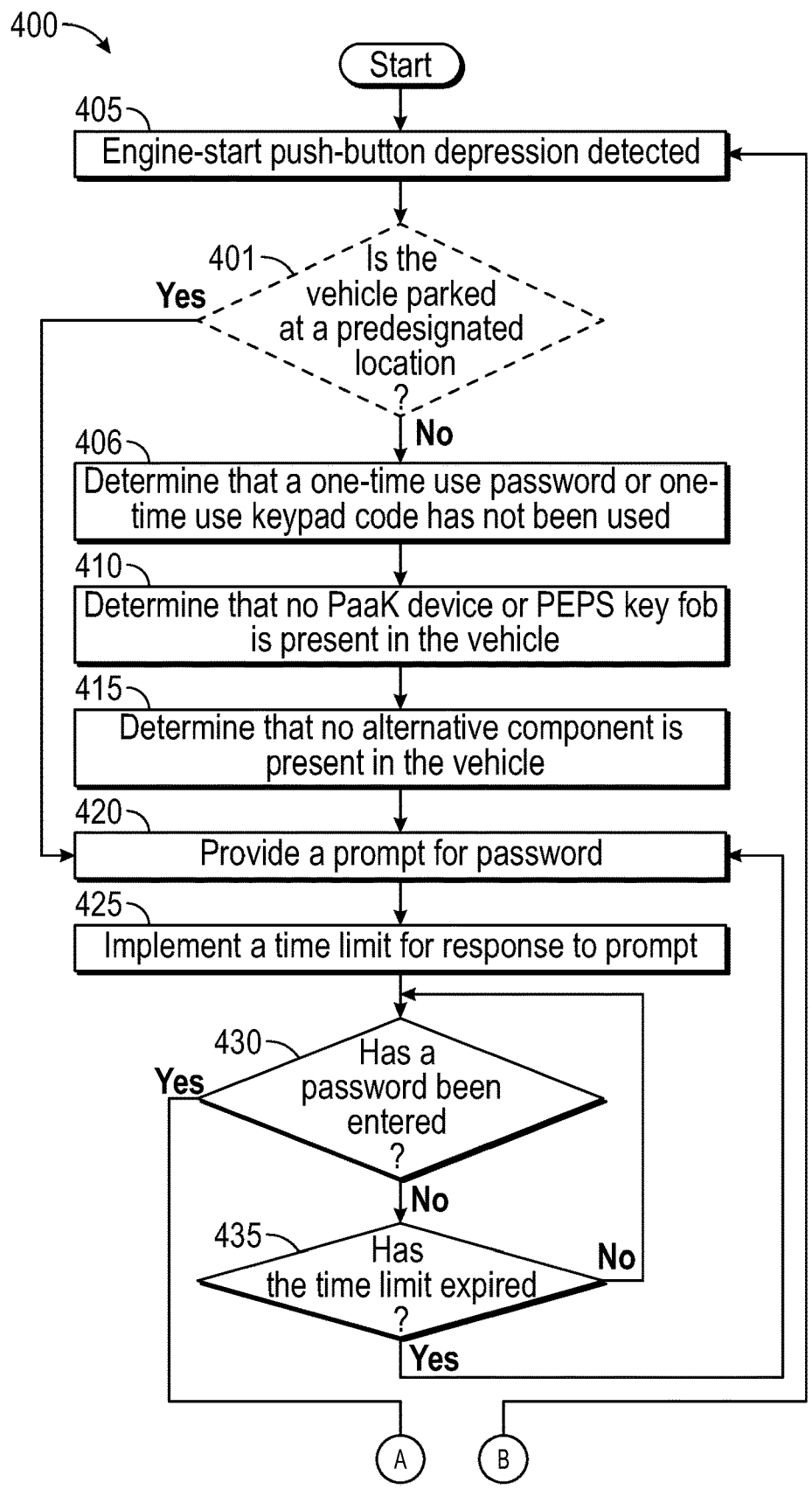
FIG. 4 shows a flowchart of an exemplary method in accordance with the disclosure for ensuring password security when a password is used to start a vehicle.
Figure 4:
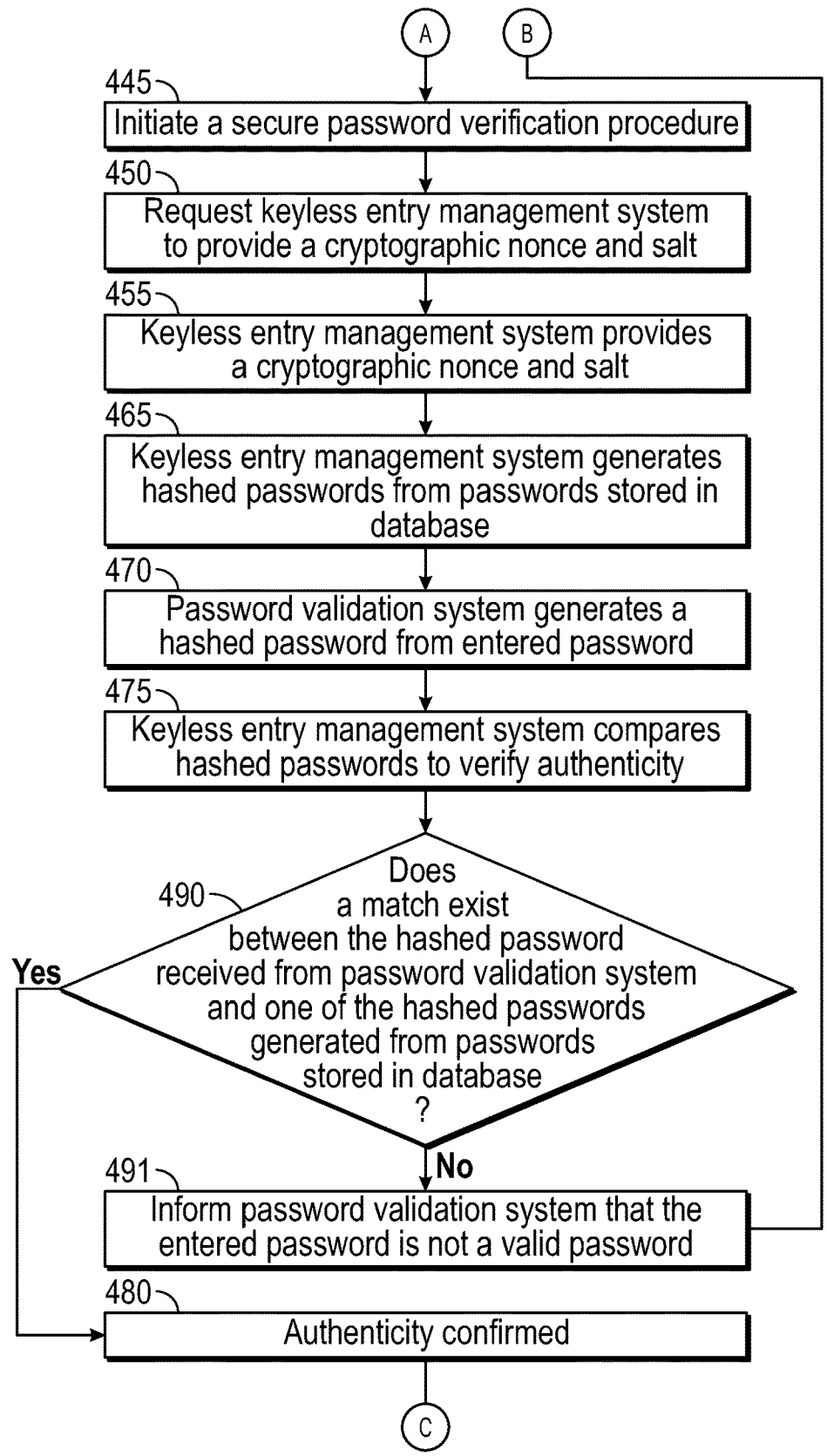
Figure 4:
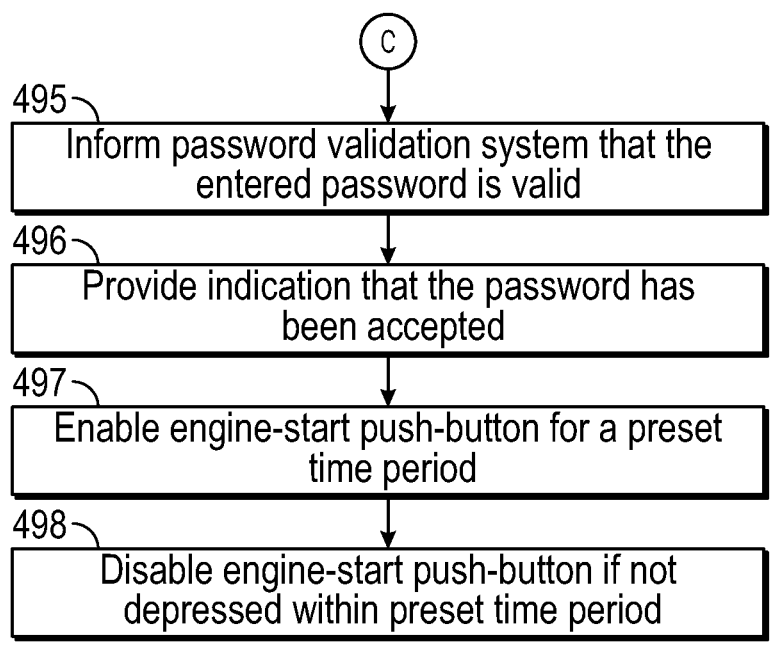

FIG. 4 shows a flowchart 400 of an exemplary method in accordance with the disclosure for ensuring password security when a password is used to start a vehicle. The flowchart 400 illustrates a sequence of operations that can be implemented in hardware, software, or a combination thereof. In the context of software, the operations represent computer-executable instructions stored on one or more non-transitory computer-readable media such as the memory 240, that, when executed by one or more processors such as the processor 225, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 400 may be carried out by using the keyless entry management system 105, the password validation system 205, and/or the infotainment system 145. The description below may make reference to certain components and objects shown in FIGS. 1-3, but it should be understood that this is done for purposes of explaining certain aspects of the disclosure and that the description is equally applicable to many other embodiments.

At block 405, a depression of the engine-start push-button 155 in the vehicle 115 is detected. At block 401, an optional action may be carried out to determine if the vehicle 115 is parked at a predesignated location when the engine-start push-button 155 is depressed. Another determining factor could be how long vehicle 115 is parked at a predesignated location or a duration of time that the vehicle 115 is parked at any location. A few examples of a predesignated location can include a garage, a driveway of a residence of the driver 315 of the vehicle 115, or a roadway that is predesignated by a person such as the driver 315 of the vehicle 115. If the vehicle 115 is parked at such a predesignated location, certain actions that may be a part of a verification procedure may be omitted (described below at blocks 406, 410, and 415).

At block 406, the keyless entry management system 105 may execute a verification procedure that includes determining that a one-time-use password or a one-time-use keypad code has not been used. A one-time-use password or one-time-use key code is typically provided to a person such as a parking lot attendant or a valet for purposes of parking the vehicle 115.

At block 410, the keyless entry management system 105 may further determine that no PaaK device or PEPS key fob is present inside the vehicle 115, or within the defined geofence 305 outside the vehicle 115. The determination may be carried out in various ways. In one exemplary approach, the wireless communication system 220 may execute a wireless polling procedure to communicate with a PaaK device and/or a PEPS key fob if present either inside or outside the vehicle 115. A RSSI or ToF trilateration procedure may be used to detect and locate a PaaK device and/or a PEPS key fob if one or both are present inside the vehicle 115.

If no PaaK device or PEPS key fob is detected inside the vehicle 115, at block 415, the keyless entry management system 105 may determine that an alternative component to a PEPS key fob is not present in the vehicle 115. The alternative component may be an object such as an NFC card or a fingerprint input device that is used in lieu of a PEPS key fob by the driver 315.

If neither a PaaK device, a PEPS key fob, nor an alternative component to the PEPS device is found inside the vehicle 115, at block 420, the password validation system 205 may provide a prompt upon the display system 215 of the infotainment system 145 for entering of a password. The prompt may be accompanied by guidance, such as a list of requirements for a valid password and an instruction to enter a password two times so as to ensure accuracy.

At block 425, a time limit for receiving a response to the password validation prompt may be set by the password validation system 205. A count-down timer or other such element may be used to implement a time window for the time limit operation. Setting a time limit may minimize the chances of an improper use of the password prompt.

At block 430, a determination may be made whether a password has been entered. If no password has been entered, at block 435, a determination is made whether the time limit has expired. If the time limit has expired, any password that is subsequently received may be ignored.

If a password has been entered, at block 445, the password validation system 205 may initiate a secure password verification procedure to ensure that no malicious operations take place when the password is being processed in the vehicle 115. As a part of the secure password verification procedure, at block 450, the password validation system 205 may request the keyless entry management system 105 to provide a cryptographic nonce and salt.

At block 455, the keyless entry management system 105 may execute the password challenge module 250 and respond to the request by providing a cryptographic nonce and salt to the password validation system 205.

At block 465, the keyless entry management system 105 may execute the password challenge module 250 and/or the password management module 245 to access one or more passwords stored in the database 255 and use the cryptographic nonce and salt to compute one or more hashed passwords of the passwords fetched from the database 255.

At block 470, the password validation system 205 may compute a hash of the entered password by using the cryptographic nonce and salt provided to the password validation system 205 (at block 455) by the keyless entry management system 105 (at block 455) and transmit the hashed password to the keyless entry management system 105.

At block 475, the keyless entry management system 105 may query the password challenge module 250 and/or the password management module 245 to verify the authenticity of the hashed password received from the password validation system 205. The verification may be carried out by comparing the hashed password received from the password validation system 205 with the hashed password that was computed by the password challenge module 250 (at block 460).

At block 490, the password management module 245 may verify if a match exists between the hashed password received from the password validation system 205 and one of the hashed passwords generated from the passwords stored in the database 255 (at block 465).

If a match does not exist, at block 491, the keyless entry management system 105 informs the password validation system 205 that the entered password is not a valid password.

If a match exists, at block 480, the password challenge module 250 and/or the password management module 245 may determine from the comparison that the hashed password provided by the password validation system 205 is valid and that the security verification procedure has been satisfactorily completed.

At block 495, the keyless entry management system 105 informs the password validation system 205 that the entered password is a valid password.

At block 496, the password validation system 205 may provide a notification upon the display system 215 of the infotainment system 145 that the password has been accepted and that the vehicle 115 may be started by depressing the engine-start push-button 155.

At block 497, the engine-start push-button 155 may be enabled for a preset period of time to allow a driver of the vehicle 115 to start the vehicle 115. Upon expiry of the preset time period, at block 498, the engine-start push-button 155 may be disabled and a prompt displayed upon the display system 215 of the infotainment system 145 requesting re-entering of a password.

In at least some exemplary embodiments in accordance with the disclosure, the keyless entry management system 105 may be configured to offer certain protection features. In an exemplary operation in accordance with one such protection feature, the keyless entry management system 105 may cooperate with the wireless communication system 220 and/or a GPS system in the infotainment system 145 to identify one of various locations at which the vehicle 115 is parked. These various locations may be predefined as either problem locations (for example, high crime areas) or undesirable locations where the vehicle 115 is not expected to be parked (a vehicle chop shop, for example). Upon identifying the parking of the vehicle 115 at such locations, the keyless entry management system 105 may take certain steps to protect the vehicle 115 such as, for example, disabling providing of the password prompt on the infotainment system 145 or any other display device in the vehicle 115. The driver 315 may be provided the option to turn off or turn on this protection feature selectively.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 240, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    detecting a depression of an engine start push button in a vehicle;
    executing, upon detecting the depression of the engine start push button, a verification procedure comprising:
        determining that no phone-as-a-key (PaaK) device is present inside the vehicle and within a defined geofence outside the vehicle;

determining that no pass-entry-passive-start (PEPS) key fob is present inside the vehicle and within the defined geofence outside the vehicle;

determining that a one-time-use key code has not been used to open a door of the vehicle; and determining that a one-time-use password has not been used inside the vehicle;

displaying, subject to a successful completion of the verification procedure, a prompt upon a display screen in the vehicle, the prompt comprising a request for entry of a first password;

executing, upon receiving the first password, a password verification procedure, the password verification procedure directed at verifying a validity of the first password; and displaying, upon completion of the password verification procedure, a message on the display screen, the message providing an indication of one of a successful password verification or a failed password verification.

2. The method of claim 1, wherein the password verification procedure comprises:

requesting a challenge;

receiving the challenge and a cryptographic key;

responding to the challenge by using the challenge and the cryptographic key to compute a hash of the first password and transmitting the hash; and receiving, based on verification of the hash, the indication of the one of the successful password verification or the failed password verification.

3. The method of claim 2, wherein the challenge comprises a nonce, wherein the cryptographic key includes a salt, and wherein if the password verification is successful, enabling starting of an engine of the vehicle.

4. The method of claim 3, wherein enabling starting of the engine of the vehicle comprises enabling operating of an engine-start pushbutton in the vehicle.

5. The method of claim 3, wherein the indication of the successful password verification comprises the message being displayed on the display screen for a predefined amount of time, the message instructing a driver of the vehicle to start the vehicle.

6. The method of claim 1, further comprising:

eliminating the verification procedure when the vehicle is at least one of parked in a first location over a predesignated period of time or is parked in a predesignated location; and displaying upon the display screen in the vehicle, when the verification procedure is eliminated, the prompt comprising the request for entry of the first password.

7. The method of claim 6, wherein the predesignated location is in one of a garage, a driveway, or a roadway that is predesignated by a first individual associated with the vehicle, the first individual being one of an owner of the vehicle or an authorized driver of the vehicle.

8. A method comprising:

detecting a depression of an engine start push button in a vehicle;

determining whether the vehicle is parked in a predesignated location;

displaying, if the vehicle is parked in the predesignated location, a prompt upon a display screen in the vehicle, the prompt comprising a request for entry of a first password;

executing a password verification procedure upon receiving the first password, the password verification procedure directed at verifying a validity of the first password;

upon completion of the password verification procedure, displaying a message on the display screen, the message providing an indication of one of a successful password verification or a failed password verification;

if the password verification is successful, enabling starting of an engine of the vehicle; and if the password verification has failed, disabling starting of the engine of the vehicle.

9. The method of claim 8, wherein the predesignated location includes a parking spot that is predesignated by a first individual associated with the vehicle.

10. The method of claim 9, wherein the first individual is one of an owner of the vehicle or an authorized driver of the vehicle, and wherein the parking spot is located in one of a garage, a driveway, or a roadway that is predesignated by the first individual associated with the vehicle.

11. The method of claim 8, further comprising:

if the vehicle is not parked in the predesignated location, executing a verification procedure comprising:

verifying that no phone-as-a-key (PaaK) device is present inside the vehicle and within a defined geofence outside the vehicle;

verifying that a one-time-use key code has not been used to operate a door of the vehicle; and verifying that a one-time-use password has not been used inside the vehicle; and subject to a successful completion of the verification procedure, displaying the prompt upon the display screen in the vehicle, the prompt comprising the request for entry of the first password.

12. The method of claim 8, wherein the password verification procedure comprises:

requesting a challenge;

receiving the challenge and a cryptographic key;

responding to the challenge by using the challenge and the cryptographic key to compute a hash of the first password and transmitting the hash; and receiving, based on verification of the hash, the indication of the one of the successful password verification or the failed password verification.

13. The method of claim 12, wherein the challenge comprises a nonce, wherein the cryptographic key includes a salt, and wherein starting of the engine of the vehicle is enabled for a predefined amount of time.

14. The method of claim 13, wherein the indication of the successful password verification comprises the message being displayed on the display screen for the predefined amount of time, the message instructing a driver of the vehicle to start the vehicle.

15. A computer comprising:

a memory that stores computer-executable instructions; and a processor configured to access the memory and execute the computer-executable instructions to at least:

detect a depression of an engine start push button in a vehicle;

execute, upon detecting the depression of the engine start push button, a verification procedure comprising:

verifying that no phone-as-a-key (PaaK) device is present inside the vehicle and within a defined geofence outside the vehicle;

verifying that a one-time-use keycode has not been used to operate a door of the vehicle; and verifying that a one-time-use password has not been used inside the vehicle;

display, subject to a successful completion of the verification procedure, a prompt upon a display screen in the vehicle, the prompt comprising a request for entry of a first password;

execute a password verification procedure upon receiving the first password, the password verification procedure directed at verifying a validity of the first password; and display, upon completion of the password verification procedure, a message on the display screen, the message providing an indication of one of a successful password verification or a failed password verification.

16. The computer of claim 15, wherein the password verification procedure comprises:

requesting a challenge;

receiving the challenge and a cryptographic key;

responding to the challenge by using the challenge and the cryptographic key to compute a hash of the first password and transmitting the hash; and receiving, based on verification of the hash, the indication of the one of the successful password verification or the failed password verification.

17. The computer of claim 16, wherein the challenge comprises a nonce, wherein the cryptographic key includes a salt, and wherein if the password verification is successful, the processor executes computer-executable instructions to enable starting of an engine of the vehicle.

18. The computer of claim 17, wherein starting of the engine of the vehicle comprises pushing an engine-start pushbutton in the vehicle.

19. The computer of claim 17, wherein the indication of the successful password verification comprises the message being displayed on the display screen for a predefined amount of time, the message instructing a driver of the vehicle to start the vehicle.

20. The computer of claim 15, wherein the processor executes computer-executable instructions to:

eliminate the verification procedure when the vehicle is at least one of parked in a first location over a predesignated period of time or is parked in a predesignated location; and display upon the display screen in the vehicle, when the verification procedure is eliminated, the prompt comprising the request for entry of the first password.

\* \* \* \* \*